United States Patent [19]

Orain

[11] 3,805,653
[45] Apr. 23, 1974

[54] METHOD AND APPARATUS FOR SIMULTANEOUSLY CUTTING A PLURALITY OF SLOTS IN THE SIDE WALL AND CLOSED END OF A BELL-SHAPED WORKPIECE

[75] Inventor: Michel Orain, Conflans-Sainte-Honorine, France

[73] Assignee: Societe Anonyme: Glaenzer Spicer, Poissy, France

[22] Filed: Nov. 24, 1972

[21] Appl. No.: 309,130

[30] Foreign Application Priority Data
Dec. 13, 1971 France .............................. 71.44712

[52] U.S. Cl. ............... 83/188, 10/72 CN, 83/466.1, 83/693, 83/694
[51] Int. Cl. ........................................... B23d 21/14
[58] Field of Search .......... 83/188, 192, 466.1, 621, 83/636, 693, 694; 10/72 CN

[56] References Cited
UNITED STATES PATENTS
1,829,215  10/1931  Fox .................................. 10/72 CN
1,351,115  8/1920   Morse .............................. 83/693 X
3,277,763  10/1966  Harvey ............................. 83/693 X Primary Examiner—Francis S. Husar
Assistant Examiner—Leon Gilden
Attorney, Agent, or Firm—Baldwin, Wight & Brown

[57] ABSTRACT

A method and device for the precision cutting of a plurality of slots with arched closed ends at regular angularly spaced intervals about the periphery of a thick-walled, bell-shaped steel workpiece. The plurality of slots are cut simultaneously in the workpiece first by an equal number of cutting blades which during a first period cut into the lateral tubular wall of the workpiece by relative displacement along the axis of the workpiece. The workpiece is held in a cutting die which is mounted on a punch press and which during a second period cuts into the outer closed end of the workpiece during the continued relative axial displacement. In a final preferred step the chips formed during the previous steps are severed by the radial outward displacement of the cutting blades toward the cutting edges of the cutting die along slides spring biased to their initial position and inclined toward the cutting die. Alternatively, the cutting blades may be mounted fixed relative to one another in a unitary block.

9 Claims, 19 Drawing Figures

METHOD AND APPARATUS FOR SIMULTANEOUSLY CUTTING A PLURALITY OF SLOTS IN THE SIDE WALL AND CLOSED END OF A BELL-SHAPED WORKPIECE

The present invention concerns a method and apparatus for simultaneously cutting a plurality of slots in the side wall and closed end of a bell-shaped workpiece with the use of a punch press. Such a method is intended to replace conventional machining methods of removing small chips which are much slower, more expensive and less accurate because the slots are cut one by one.

According to the invention, the method of cutting a plurality of slots in the side wall and closed end of a bell-shaped member, comprises, during a first period, cutting the tubular wall of the said member by axial displacement of cutting blades relative to the said member in order to simultaneously cut all the slots; then, during a second period, successively and without interruption dieing out the closed end of the member while continuing the axial displacement of the said blades; and finally, severing the chips formed in the previous steps.

The invention also concerns a device for carrying out the above method, comprising a cutting die carrying the workpiece, having a cavity complementary to the outer the bell-shaped surface of the work-piece and having as many openings as there are slots to be cut in the workpiece, the intersection of the wall of these slots with the said cavity defining the cutting edge of the cutting die, a plate carrying a plurality of cutting blades equal to the number of said slots, each blade having a cutting edge defined like the cutting edge of the cutting die, so as to effect the desired profile of the slots means for displacing the cutting die and plate towards each other along the axis of the workpiece, and means for removing the chips formed during machining.

According to a preferred embodiment, the means for severing the chips comprises means for simultaneously displacing the blades axially and radially in order to move the cutting edges of the blades toward the cutting edge of the cutting die in order to ensure the severing and removal of the chips.

Other features and advantages of the invention will be brought out in the description which follows of an embodiment of the device for carrying out the method defined above, the description given merely by way of example with reference to the accompanying drawings, in which.

Figure 10E:
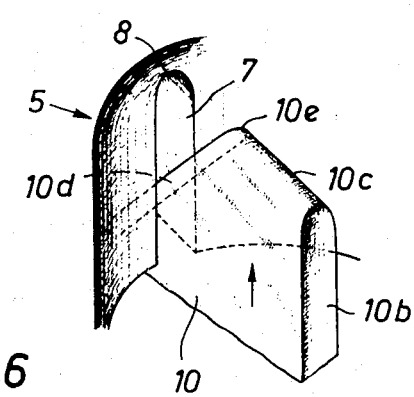

FIGS. 10a, 10b, 10c, 10d schematically illustrates four phases of the cutting out operation;

FIG. 10e schematically illustrates the interpenetration of a blade and of the die, the workpiece being removed.

Figure 11:
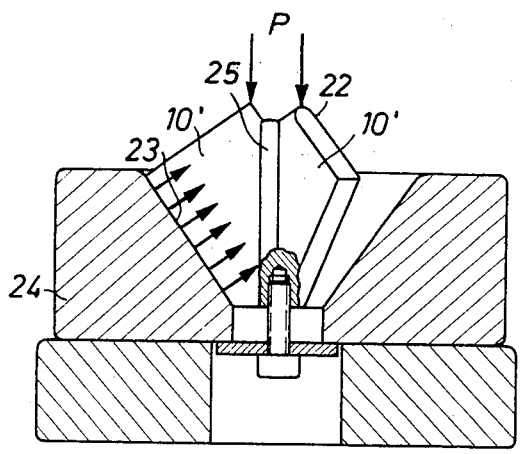
Figure 12:
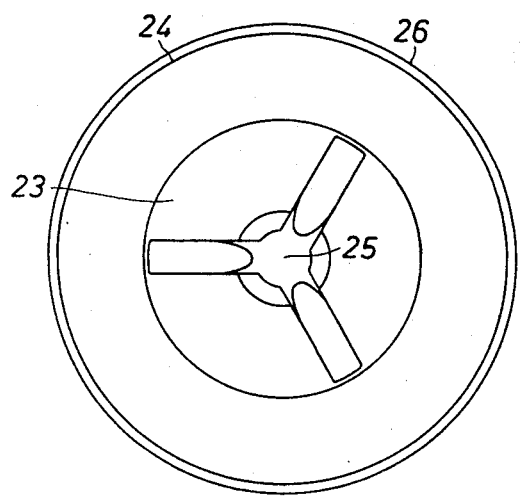

FIG. 11 shows an alternative embodiment of the mounting of the cutting blades;

FIG. 12 shows a bottom view of the alternative mounting in FIG. 11, and

Figure 14:
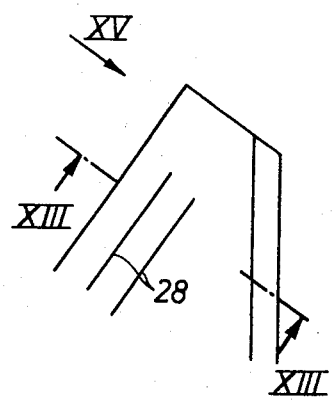
Figure 13:
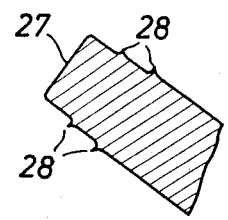
Figure 15:
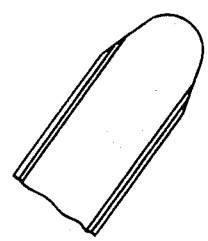

FIGS. 13, 14 and 15 show various details of the cutting blades with additional set-back cutting edges.

Figure 1:
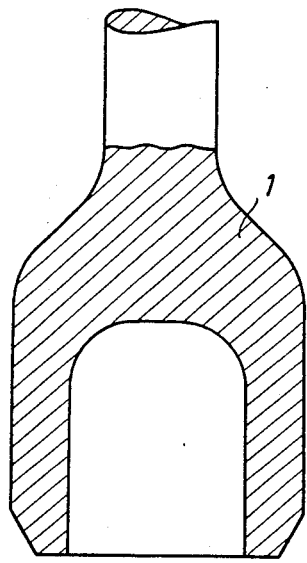
FIG. 1 shows an axial sectional view of an example of a bell-shaped steel workpiece before cutting the slots.
Figure 2:
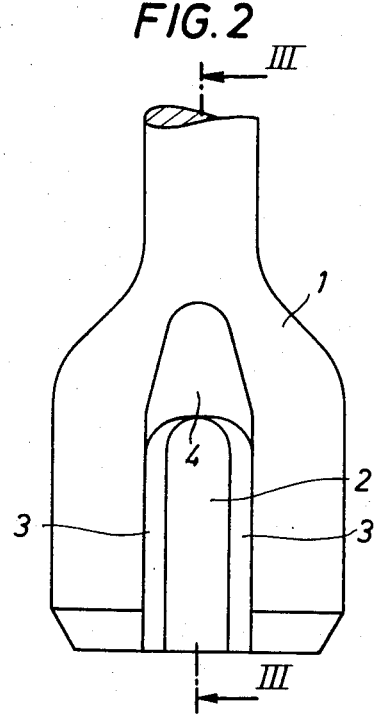
FIG. 2 shows an elevation view of the workpiece of FIG. 1, after cutting three slots according to the method of the present invention.
Figure 3:
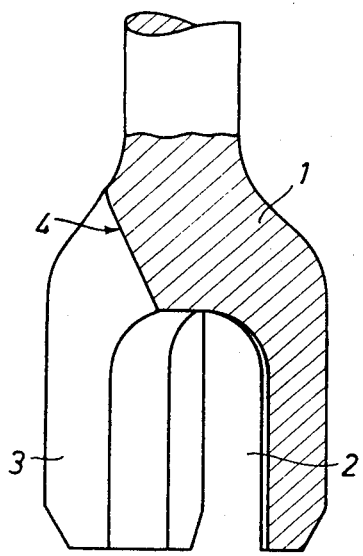
FIG. 3 is a sectional view of the workpiece taken along the line III—III in FIG. 2.
Figure 4:
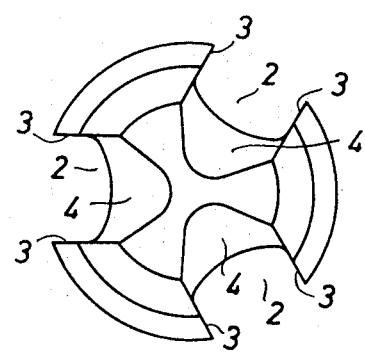
FIG. 4 is a bottom plan/view of the workpiece in FIG. 2.
Figure 5:
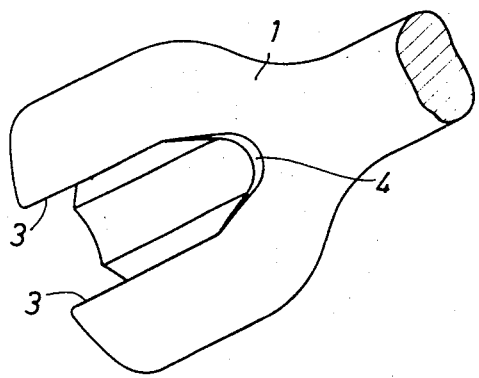
FIG. 5 shows a perspective view of the workpiece in FIG. 2.

FIG. 1 shows a bell-shaped workpiece having a tubular or side wall and a closed end in which three slots or openings 2 having opposed lateral surfaces 3 and an arched closed end 4 are to be cut thereby forming the member shown in full size in FIG. 5. The slots 2 are regularly angularly arranged around the periphery of the bell-shaped workpiece 1.

In order to obtain slots with precise angular spacing and dimensions, the slots must be cut simultaneously. In view of the small amount of free interior space and the wall thickness of the workpiece, novel arrangements were necessary in order to ensure sufficient mechanical strength of the tools and the desired slot profile and precision.

Figure 6:
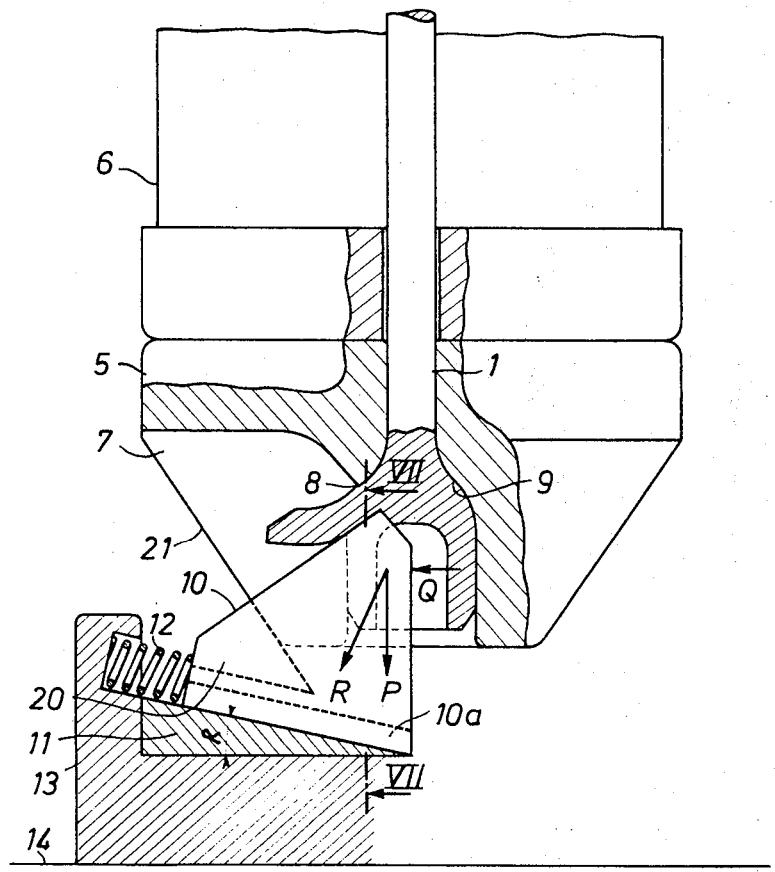
FIG. 6 shows a partial section view of the entire device during the cutting slots in a workpiece identical to that of FIG. 1.

In FIG. 6 an arrangement is illustrated which was specially conceived for carrying out the method according to the invention which is described in detail with reference to FIG. 10a–d.

The entire arrangement shown in FIG. 6 essentially comprises a cutting die 5 and a group of cutting blades 10 mounted on slides 11.

A workpiece identical to that shown in FIG. 1 is supported on a cutting die 5 having a cavity 9 complementary to the outer bell-shaped surface of revolution of the workpiece 1. The cutting die 5 is fixed to a punch press 6.

The cutting die 5 has as many openings 7 (see FIG. 9) as the workpiece is to have slots. The intersection 8 of the openings and the internal cavity 9 of the cutting die constitute the cutting edges of the die.

Figure 7:
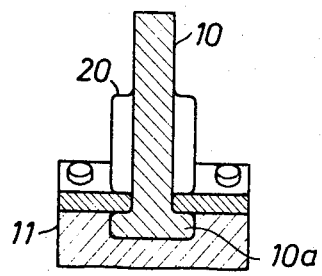
FIG. 7 shows a sectional view taken along the line VII—VII of the device in FIG. 6.
Figure 8:
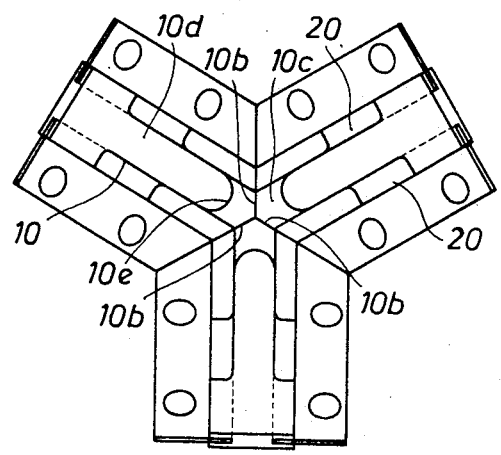
FIG. 8 is a top plan view of cutting blades with their slides in the device in FIG. 6.

The cutting blades 11 are guided and supported by the slides 11 (see FIGS. 7 and 8). The blades 10 are identical and three in number. Each blade 10 have a T-shaped end portion 10a enabling sliding in the slides 11. Three blades 10 are in contact with one another along their chamfered vertical surfaces 10b. The operative surfaces of the blades 10 comprise a substantially cylindrical surface 10c inclined according to the slope of the closed end of the resulting arched slot 4 and a substantially planar surface 10d inclined at approximately 45° to the horizontal. The surfaces 10c and 10d determine a cutting edge 10e adapted to cooperate with the intersection 8 of the cutting die.

Further, the blades 10 carry bosses or cams 20 along their flanks which are adapted to bear against the sides 21 delimiting the openings in the cutting die 5.

The top surface of the slides 11 make an angle α with the horizontal. The unit formed by the slides is fixed on the plate 13 which is supported on the table 14 of the punch press. Further, springs 12 are interposed between the plate 13 and the blades 10 in order to maintain the chamfered surfaces 10b of the blades in the rest or initial position of the cutting assembly.

The operation of the device illustrated in FIG. 6 will now be described with reference to FIGS. 10a–d.

Figure 10A:
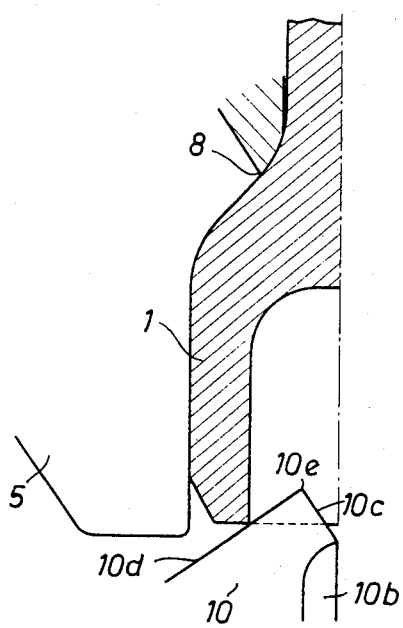

FIG. 10a shows the position of a cutting blade 10 relative to the workpiece 1 held in the cutting die at the moment the surface 10d attacks the open end of the workpiece.

Figure 10C:
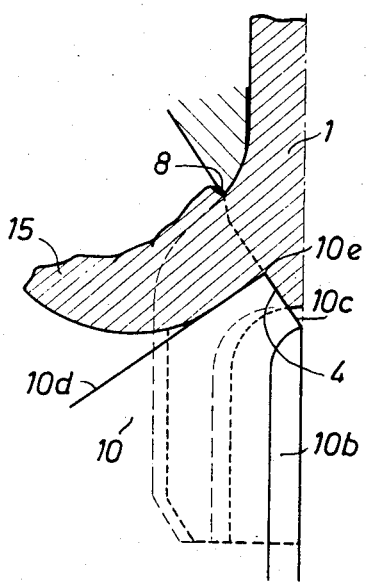
Figure 10B:
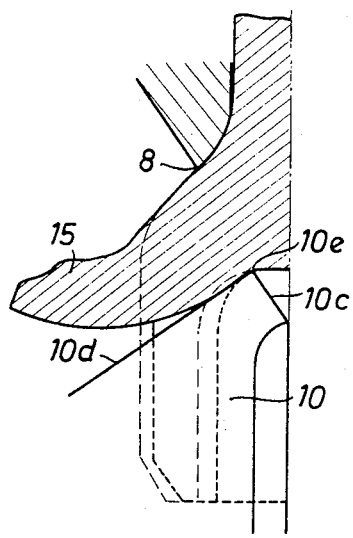

During the first operating step illustrated in FIG. 10b, the blades 10 are displaced vertically relative to the workpiece 1 while remaining continuously in contact along their chamfered surfaces 10b. In this step the cutting of the opposed lateral surfaces 3 of the slots in the workpiece 1 is effected. During this step, the chips 15 resulting from the associated cutting remain attached to the workpiece 1.

The second step is illustrated in FIG. 10c and comprises dieing-out of the workpiece in order to assure the precise shape of the arched end portion of the slot 4 with an excellent resultant surface. During the second step, the cutting blades 10 continue their vertical displacement, axially relative to the workpiece 1 while in contact with one another as the cutting edge 10c penetrates into the workpiece 1.

Figure 10D:
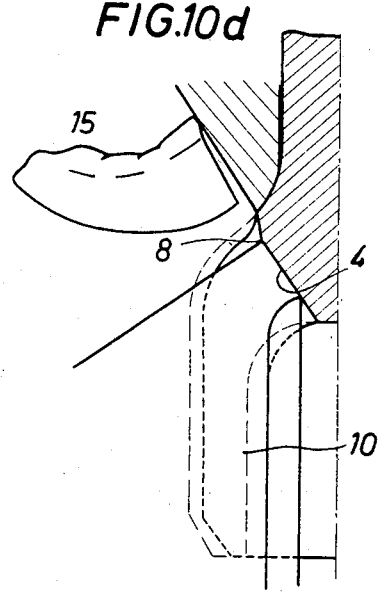

During the third step shown in FIG. 10d, the blades 10 continuing their vertical displacement along with a radial displacement so that the blades move apart from one another in order to sever the chip 15 and its removal. The adjustment of the point of separation on the blades is effected by the angle of slope of the slide and the action of the cams carried by the blades 10 coming to bear against the sides 21 of the cutting die 5.

FIG. 10e illustrates the interpenetration of a cutting blade with its cutting edge 10e and of the cutting die 5 with its cutting edge 8 provided by the opening 7. The cutting edges 10e and 8 are complementary in shape so that the blade 10 can move in the opening 7 with a very little clearance.

During the cutting, an axial force P is exerted by the workpiece against the blades 10, and a radial force Q results from the bearing reaction of the blades owing to the angle of incline of the slides 11. The resultant force exerted on the blades is directed along the arrow R which relieves the central zone of the blades.

FIGS. 10a–10d illustrate the movements of the cutting blades 10 relative to the workpiece 1. In practice, either the cutting die 5 is movable and is displaced vertically relative to the plate 13 which remains stationary, or, on the contrary, the cutting die 5 is stationary and the plate 13 is displaced toward the cutting die. The successive steps illustrated in FIGS. 10a–10d are effected without any interruption.

The method described above is therefore much more rapid and precise than conventional methods since in the course of a single operation all the arched slots are cut in the workpiece simultaneously.

In an alternative embodiment shown in FIGS. 11 and 12, the group of three blades 10' are formed in a unitary block, therefore there are no slides or radial movement of the blades. The severing of the chips may be effected by any other means.

In this embodiment, the cutting blade unit 22 is supported on a conical surface of revolution 23 in a high-strength annular member 24 such that the axial cutting force P caused by the force of reaction against the conical surface creates radial compressive stresses in the central portion and the attacking portion of the cutting blade unit 22.

The forces exerted on the tool to effect separation of the chip are therefore greatly reduced and the tool is able to withstand enormous repetitive forces which are developed in the course of industrial use.

In this case, the cutting device functions according to the operative steps illustrated in FIGS. 10, 10b and 10c since there is no radial movement of the blades 10'.

Figure 9:
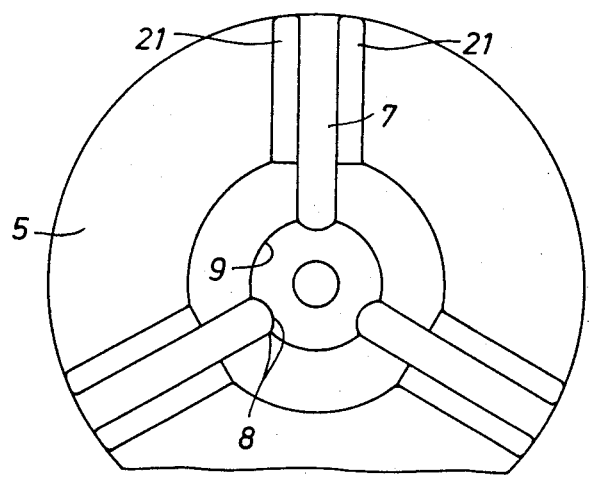
FIG. 9 shows a bottom plan view of the cutting die of the device in FIG. 6 without the workpiece.

In addition, the cutting die of the device is exactly as shown in FIG. 9.

Finally, the cutting blades in the embodiment of FIGS. 6 and 8 as well as the embodiment of FIG. 12 may comprise, as shown in FIGS. 13–15, additional cutting edges 28 set back relative to the leading edge 27 in the direction of the advance of the tool, which are intended to pass lightly over the just-cut surface in order to improve the surface finish of the lateral surfaces 3 of the slots. The additional cutting edges 28 remove small chips.

Generally speaking the method described hereinabove may be applied to workpieces of high strength materials such as steel having end wall thicknesses of the order of 35–60 percent of the interior diameter, which, of course, is not possible with known means.

Moreover, if the bell-shaped workpieces in which the slots are to be formed have incomplete, roughly cut-out slots lacking precision formed during the hot working of the workpiece, it goes without saying that the device and method according to the present invention may be used under such circumstances to obtain arched slots with precise opposed lateral walls, in this case the fatigue of the cutting blades is reduced.

Finally, the present invention is obviously not limited to the particular preferred embodiments described and illustrated herein but is, on the contrary, applicable to all variations and modification within the scope of the appended claims.

What we claim is:

1. A device for precision machining a plurality of angularly spaced slots in a thick-walled, bell-shaped workpiece having a tubular lateral wall and a closed end wall comprising: an equal plurality of angularly spaced cutting blades, a plate supporting the plurality of cutting blades, and a cutting die for carrying the workpiece having a cavity complementary to the exterior bell-shaped surface of the workpiece, and spaced openings of a number equal to the slots to be machined, the intersection of the wall of the openings with the cavity defining cutting edges of the die, the cutting edges of the cutting blades being complementary in shape to the cutting edges of the cutting die, means for displacing the cutting die relative to the plate along the axis of the workpiece, and means for severing the chips being cut in the workpiece.

2. A device according to claim 1, wherein the cutting blades are formed integral with one another.

3. A device for precision machining a plurality of angularly spaced slots in a thick-walled, bell-shaped workpiece having a tubular lateral wall and a closed end wall comprising: an equal plurality of angularly spaced cutting blades, a plate supporting the plurality of cutting blades, a cutting die for carrying the workpiece and having a cavity complementary to the exterior bell-shaped surface of the workpiece, and spaced openings of a number equal to the slots to be machined, the intersection of the wall of the openings with the cavity defining cutting edges of the die, the cutting edges of the cutting blades being complementary in shape to the cutting edges of the cutting die, means for displacing the plate relative to the cutting die along the axis of the workpiece, and means for simultaneous axial and radial displacement of the cutting blades so that in the course of cutting the cutting edges of the cutting blades approach the cutting edges of the cutting die in order to assure the severing of chips being cut in the workpiece.

4. A device according to claim 3, wherein said means for simultaneous axial and radial displacement comprises inclined cam surfaces integrally formed on the cutting blades and cooperable cam surfaces parallel to the generatrices of the closed end of the slots to be formed in the workpiece.

5. A device according to claim 4, wherein during the axial displacement the cutting blades move radially outwardly from a position of contact with one another.

6. A device according to claim 3, wherein said means for simultaneous axial and radial displacement comprises slides guiding and supporting the cutting blades, said slides being inclined towards the device in order to transmit the forces exerted on the blades substantially outwardly.

7. A device according to claim 3, further comprising return springs for bringing the blades back to their initial position.

8. A device according to claim 3, wherein the slots to be machined in the workpiece are of constant width, and wherein the cutting edge of each cutting blade is formed by two parallel segments spaced by a distance equal to the width of the slot, said segments, being inclined toward the axis of the workpiece and joined at their ends closest to the axis of the workpiece by a concave curve.

9. A device according to claim 3, wherein the flanks of the cutting blades are provided with finishing cutting edges set back from the cutting edges thereof.

* * * * *